United States Patent [19]
Skerker et al.

[11] Patent Number: 5,014,921
[45] Date of Patent: May 14, 1991

[54] POTATO MASHER

[75] Inventors: Robert B. Skerker, Buffalo, N.Y.; William Prindle, Santa Barbara, Calif.

[73] Assignee: Robinson Knife Manufacturing Co., Inc., Springville, N.Y.

[21] Appl. No.: 494,596

[22] Filed: Mar. 16, 1990

[51] Int. Cl.⁵ .............................................. A47J 42/00
[52] U.S. Cl. ................................................. 241/169.2
[58] Field of Search ............................. 241/169.2, 168

[56] References Cited

U.S. PATENT DOCUMENTS

| 50,724 | 10/1865 | Niel | 241/169.2 |
| 54,987 | 5/1866 | Whitney | 241/169.2 |
| D. 282,433 | 2/1986 | Rauen et al. | |
| 3,352,340 | 11/1967 | Hulterstrum | 241/169.2 |
| 3,8985,548 | 7/1975 | Sauve | 241/169.2 |

Primary Examiner—Timothy V. Eley
Attorney, Agent, or Firm—Hedman, Gibson, Costigan & Hoare

[57] ABSTRACT

A potato masher integrally formed in a single piece made of polyetherimide.

9 Claims, 1 Drawing Sheet

POTATO MASHER

FIELD OF THE INVENTION

This invention relates to kitchen implements and more particularly to kitchen implements for mashing potatoes. Most specifically, the invention relates to an improved potato masher structure integrally formed in one piece.

BACKGROUND OF THE INVENTION

A masher is a kitchen implement used to break up potatoes to make mashed potatoes. The potato masher is grasped by a handle and moved in an up and down fashion to break up the potato.

A potato masher is usually formed with wooden or plastic handles and is provided with a metal mashing element.

Metal mashing elements have provided long service life since the metal mashing elements rarely break. However, with the introduction of porcelain cookware and/or nonstick coated cookware, traditional metal mashers have become less useful since the metal mashing element can cause surface scratches or otherwise destroy the surface of the cookware. Further, the metal mashing elements tend to rust or tarnish after repeated use and cleaning.

Potato mashers such as these require a shank to connect the handle to the mashing element because of the different materials used to manufacture the different elements.

Use of different materials thus affects durability. After repeated use, the connection section often becomes loose thus causing the mashing element to dislodge from the handle, often during use.

Attempts have been made to use plastics to form the mashing element; however, plastic mashing elements have proved less durable than metal mashing elements and still require use of a shank to connect the mashing element to a handle.

The configuration of traditional potato mashers tends to make cleaning of the mashing element difficult. After repeated use, food can become trapped in the mashing element.

In addition, the materials used to form the potato masher must be compatible with food. The mashing element must be sufficiently stable to avoid migration of any of the material from the mashing element to the food being handled and must satisfy regulations for use with food set by the U.S. Food and Drug Administration.

It has recently become necessary for kitchen implements to have the capacity to operate in a microwave environment. It has been discovered that polyetherimides and, in particular, polyetherimides bearing the grade designation Ultem ®1000 and Ultem ®1010 are virtually unaffected by microwave radiation.

BRIEF DESCRIPTION OF THE INVENTION

As a result of the requirements of kitchen implements, namely potato mashers, it is customary to form the implements of materials that provide the required characteristics for each element of the implement, namely the handle, connection section and mashing element.

It is an object of the present invention to provide a potato masher that is integrally formed in a single piece.

It is a further object of the present invention to provide a potato masher that is durable.

It is a further object of the present invention to provide a potato masher that is easy to clean and will not rust and will resist becoming tarnished.

Still a further object of the present invention is to provide a potato masher that can operate in high heat and microwave environments.

It is a further object of the present invention to provide a potato masher that can duplicate the effect of a metal mashing element without the risk of damaging the surface of cookware.

Accordingly, the present invention is directed to a potato masher formed in one piece. The preferred embodiment of the potato masher comprises a single piece potato masher having a handle, connection section and mashing element formed entirely of the same material, specifically polyetherimide. The mashing element is provided with a plurality of substantially parallel strips arranged transversely to the connection section that provide the potato masher with functionality and stability.

Further, the center strip extends from the connection section in the form of a transverse tapered reinforcement member. The tapered reinforcement member and connection section effect a structured member of cruciform configuration in cross-section.

BRIEF DESCRIPTION OF THE DRAWINGS

The invention will be better understood by way of example with reference to the accompanying drawings in which.

DESCRIPTION OF THE PREFERRED EMBODIMENT

Figure 1:
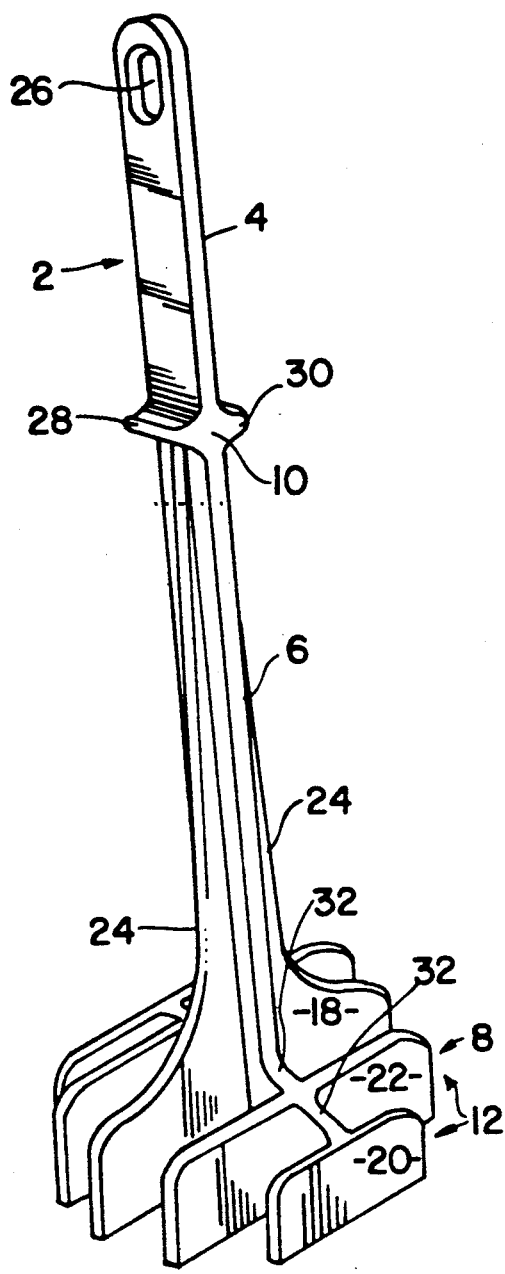
FIG. 1 is a perspective view of the potato masher of the present invention.

The potato masher (2) of the present invention as seen in FIG. 1 is comprised of a handle (4), a connection section (6) and a mashing element (8). The handle (4), connection section (6) and mashing element (8) are one continuous integrally formed piece of the same material. No separate connection parts are required.

The handle (4) has a hole (26) for hanging and a pressure surface (10) which separates the handle (4) from the connection section (6). The pressure surface (10) is comprised of aligned protuberances (28) and (30) that extend the width of the handle (4) and connection section (6) at the juncture of the handle (4) and connection section (6). The pressure surface (10) provides the user of the potato masher (2) with a means to securely grip on the handle (4). The protuberances (28) and (30) of the pressure surface (10) afford a bearing surface against which the users' thumb and forefinger can bear respectively.

The connection section (6) connects the handle (4) and mashing element (8) and extends into the mashing element (8) in a mounting web (32) that terminates at the bottom of the mashing element (8).

Figure 2:
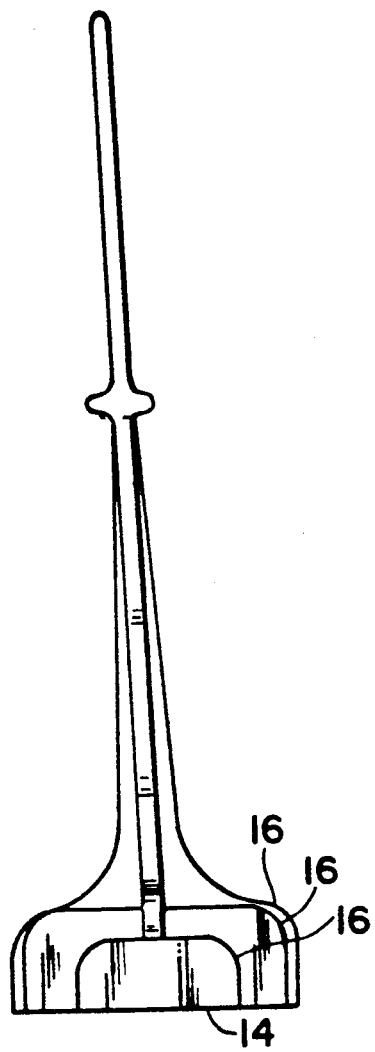
FIG. 2 is a side elevational view of the potato masher of FIG. 1 of the present invention.
Figure 3:
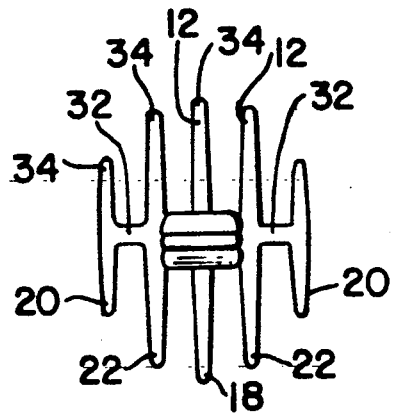
FIG. 3 is a top plan view of the potato masher of FIG. 1 of the present invention.

The mashing element (8) is provided with a plurality of rigid strips (12) that extend outwardly in a spaced apart relationship transversely from the web (32) as seen in FIGS. 2 and 3. The mounting web (32) passes through the center of each rigid strip (12) so that one-half of each strip (12) extends in directions opposite to each other.

The strips (12) are arranged to include at least one center strip (18), two outer strips (20) and a plurality of inner strips (22). The strips (12) are sized so that the center strip (18) will be greater in length than both the inner strips (22) and outer strips (20), and the inner strips (22) will be greater in length than the outer strips (20). The dimensions of the strips (12) provide the mashing element (8) with a substantially elliptical configuration, as best seen in FIG. 3.

The center strip (18) extends from a reinforcement member (24) that is arranged transversely to the connection section (6). The reinforcement member (24) tapers outwardly from each surface of the connection section (6) from a point below the respective protuberances (28) and (30) to the center rigid strip (18). In effect, the reinforcement member (24) and rigid center strip (18) are a single continuous structural member. The reinforcement member (24) and connection section (6) cooperate to form a cruciform cross-sectional configuration.

Each strip (12) of the mashing element (8) has a flat base (14) and an arch-like top (16) as seen in FIG. 2. The arch-like top (16) of the center strip (18) is configured to taper upwardly into the reinforcement member (24) extending from the connection section (6). As best seen in FIG. 3, each strip (12) tapers from a section of greatest width at the web (32) to a section of least width at the tip (34) of each strip (12).

Practice has shown that for ease of use and functionality, the mashing element (8) is most effective when each strip (12) is arranged in a substantially parallel to each other and spaced equally distant from each other.

In the current best mode of the potato masher (2), the overall length is 10½". The handle (4) is about 3¾" in length and ⅞" in width. The length of the center strip (18) is about 3", the inner strips (22) about 2 11/16", and the outer strips (20) about 1⅞" in length. The height of the outer strips (20) and inner strips (22) are ¾", and 1" respectively. The width of the respective strips (28), (20) and (22) located at the connection section (6) to the mounting web (32) is approximately ¼".

The preferred method of manufacture of the potato masher is conventional injection molding. It has also been found that use of Ultem ®1010 in constructing the potato masher of the present invention will provide the maximum benefits of this invention. Practice has also taught that Ultem ®1000 is another acceptable polyetherimide for use in forming the potato masher of the present invention which with the dimensions of the preferred embodiment provide the stability, durability and strength that attend the potato masher of the present invention.

I claim:

1. A potato masher comprising a handle, connection section, mashing element comprised of a plurality of rigid strips, and mounting web extending transversely from the connection section, said strips including at least two outer strips, at least one center strip and two inner strips that extend in parallel spaced-apart relationship transversely from the web, and wherein said handle, connection section, mounting web and mashing element are integrally formed in a single piece.

2. A potato masher as in claim 1 wherein the center strip has a length greater than the inner strips and the outer strips.

3. A potato masher as in claim 1 wherein the strips have a flat base and an arch-shaped top.

4. A potato masher as in claim 1 further comprising one-half of each strip extending from the mounting web in a director opposite to the other half of the strip.

5. A potato masher as in claim 1 further comprising means for structural reinforcement.

6. A potato masher as in claim 1 wherein the means for structural reinforcement is comprised of a tapered reinforcement member extending transversely from the connection section and a web extending directly from the connection section to the bottom of the mashing element.

7. A potato masher as in claim 1 wherein the handle has a pressure surface comprised of protuberances extending outwardly at the juncture of said connection section and the handle.

8. A potato masher as in claim 1 made of polyetherimide.

9. A potato masher as in claim 1 wherein the length of the center strip is about 3"; the length of the inner strips is about 2 11/16"; and the length of the outer strips is about 1⅞" and the width of each strip at the mounting web along with connection section is ¼".

* * * * *